United States Patent [19]
Harris

[11] 3,738,505
[45] June 12, 1973

[54] MACHINE FOR LOADING STRIPS INTO BOXES

[75] Inventor: Elwyn Dean Harris, Corning, Calif.

[73] Assignee: Commander Industries, Inc., Red Bluff, Calif.

[22] Filed: Sept. 20, 1971

[21] Appl. No.: 181,722

[52] U.S. Cl. .................. 214/6 D, 214/16 B, 198/40
[51] Int. Cl. ............................................. B65g 57/03
[58] Field of Search .............. 214/6 D, 6 DK, 6 F, 214/6 H, 6 G, 41, 16 B; 53/59 R, 78; 198/32, 40, 31 AB

[56] References Cited
UNITED STATES PATENTS

| 3,314,554 | 4/1967 | Caniberti.................... 198/31 AB |
| 3,291,010 | 12/1966 | Williamson........................ 214/6 D |
| 3,548,895 | 12/1967 | Gentry................................. 214/41 |

FOREIGN PATENTS OR APPLICATIONS

| 1,020,205 | 8/1964 | Great Britain..................... 214/6 G |

Primary Examiner—Robert G. Sheridan
Assistant Examiner—Kenneth Noland
Attorney—Lothrop & West

[57] ABSTRACT

Long molding strips are dropped into parallel boxes from the edge of a carriage initially receiving the strips and across which the strips are moved laterally by conveyor belts. The moving strips are counted into groups. For each group the carriage advances from one box to the next. After the final box is loaded the carriage returns to start position for a subsequent cycle.

8 Claims, 8 Drawing Figures

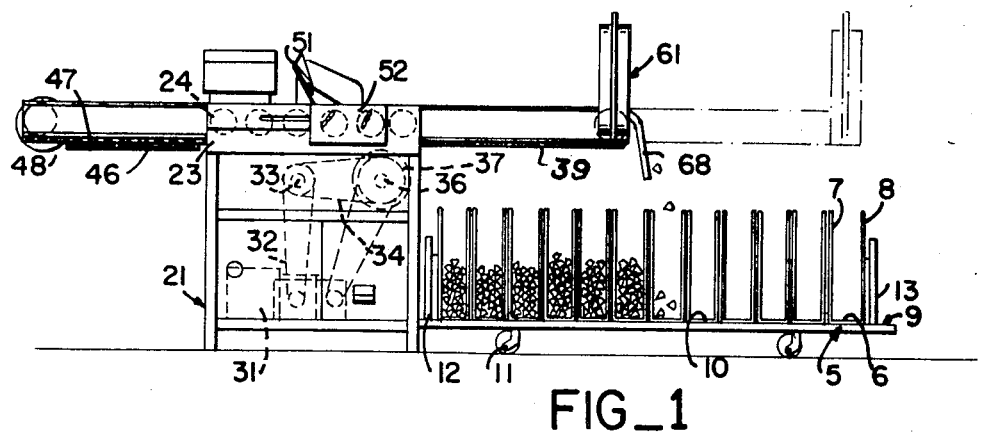
FIG_1
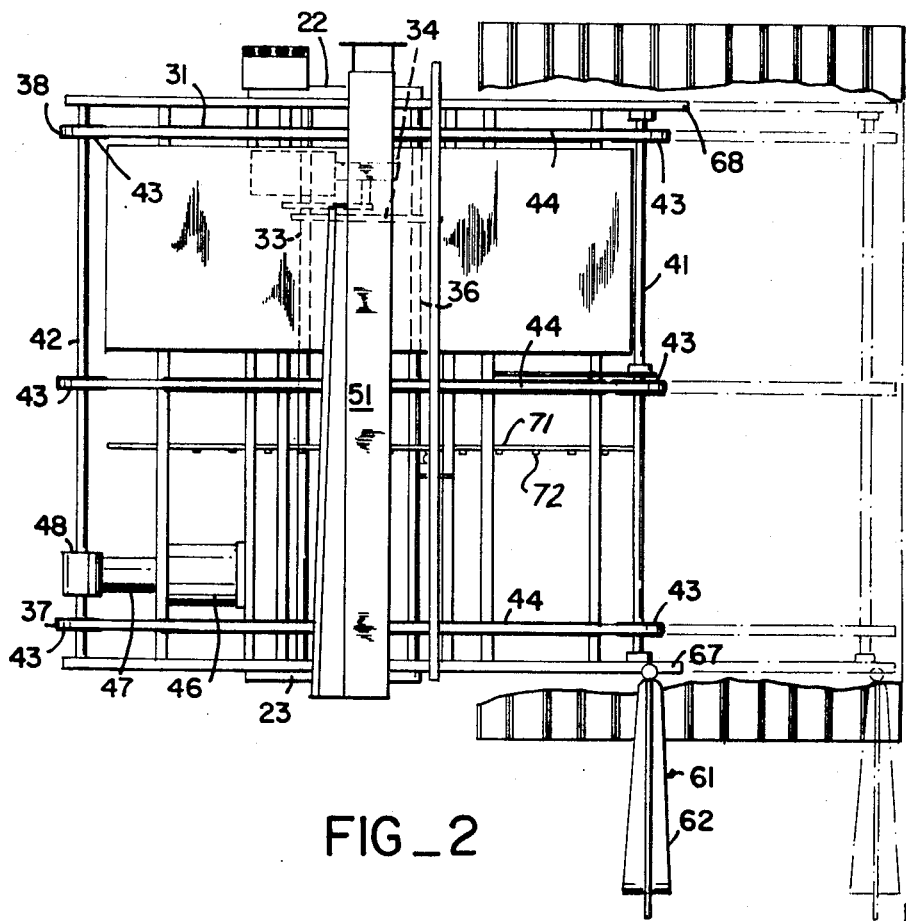
FIG_2
INVENTOR
ELWYN DEAN HARRIS
ATTORNEYS

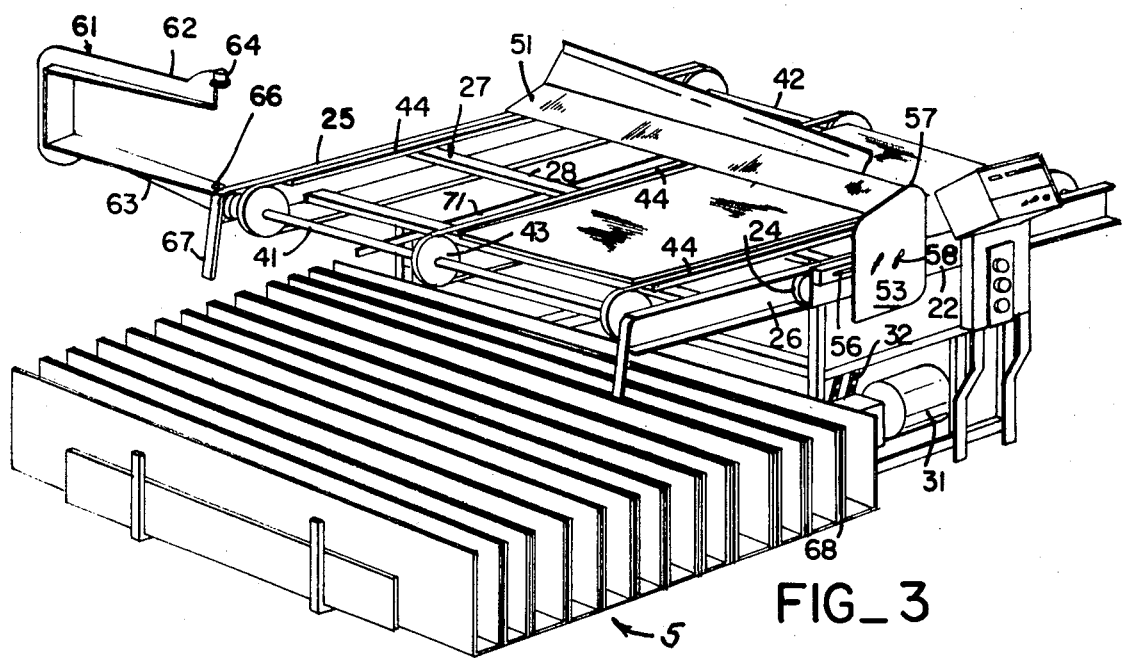
FIG_3
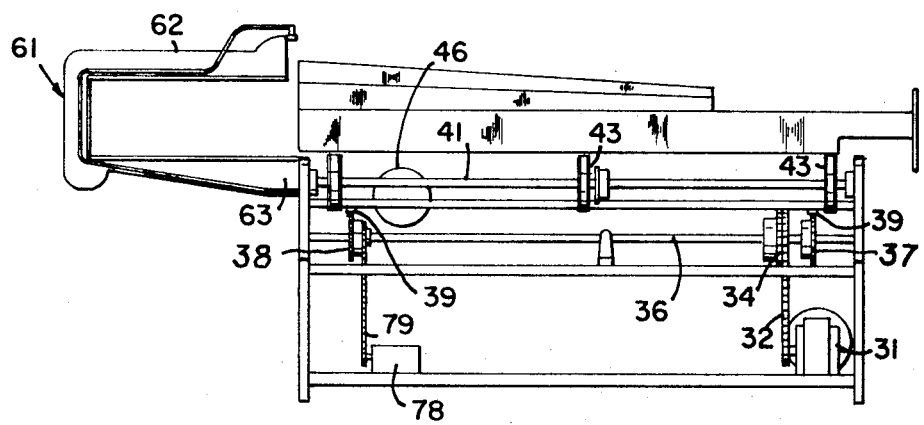
FIG_4
INVENTOR
ELWYN DEAN HARRIS
ATTORNEYS

PATENTED JUN 12 1973 3,738,505
SHEET 3 OF 3
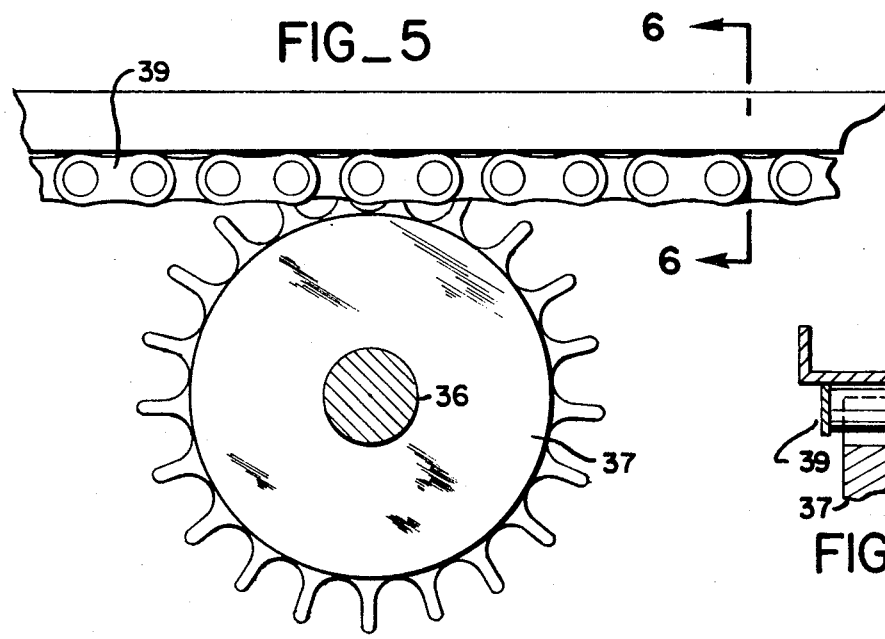
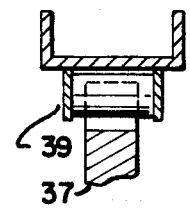
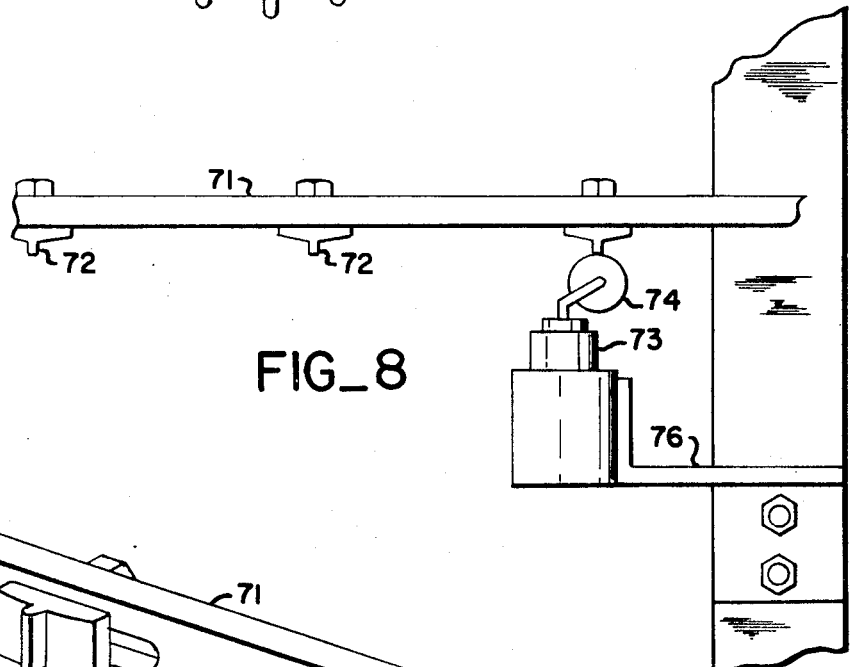
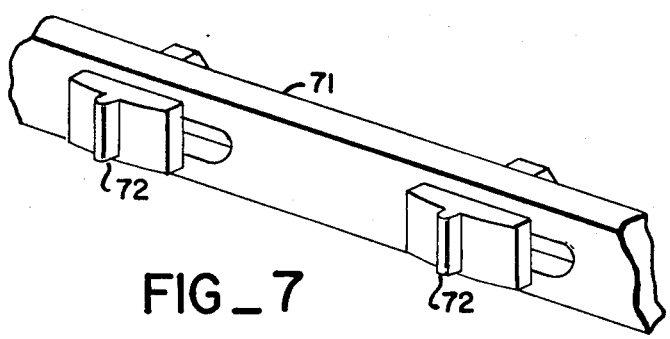
INVENTOR
ELWIN DEAN HARRIS
*Lothrop & West*
ATTORNEYS

MACHINE FOR LOADING STRIPS INTO BOXES

Certain portions of the lumber industry furnish architectural and decorative moldings. These are customarily wooden strips of a relatively small cross section but of extended length. These strips or moldings are sometimes sold bare and without protection but more recently, have preferably been packaged in a carton or box to protect them during shipment and display. Preferably there is a chosen or selected number of moldings in each one of the boxes.

It is therefore an object of my invention to provide a machine for loading strips or moldings into appropriately arranged boxes.

Another object of the invention is to provide a machine which will handle strips or moldings and will package them in groups of a preselected number per package.

Another object of my invention is to provide a means for loading strips or moldings without damage or injury to them even though they are relatively fragile.

Another object of the invention is to provide a machine for loading strips such as molding in an automatic fashion.

Another object of the invention is to provide a machine for loading strips such as molding in an improved and beneficial fashion.

Another object of the invention is in general to provide an improved molding or strip loading machine.

Other objects together with the foregoing are attained in the embodiment of the invention described in the accompanying description and illustrated in the accompanying drawings, in which:

FIG. 1 is a side elevation of a machine for loading strips pursuant to the invention, the machine being shown in an intermediate loading position;

FIG. 2 is a plan of the structure disclosed in FIG. 1;

FIG. 3 is an isometric projection showing the machine of the invention from one corner thereof;

FIG. 4 is a front elevation of the structure shown in the preceding FIGURES;

FIG. 5 is a fragmentary side elevation, to an enlarged scale and with portions in section, showing one part of the carriage driving mechanism of the device;

FIG. 6 is a fragmentary cross section, the plane of which is indicated by the line 6—6 in FIG. 5;

FIG. 7 is a detail in isometric projection showing a part of the carriage controlling structure; and FIG. 8 is a plan, with adjacent mechanism broken away, showing the interrelationship of the mechanism of FIG. 7 and of a switch in the carriage controlling electric circuit.

While the machine for loading strips can be embodied in a widely variant number of ways, it has successfully been commercially incorporated in the form shown herein in which the strips handled are moldings as finished in a lumber mill. A typical molding is a wooden strip of substantial length, say 10 or 12 feet which has a cross-sectional configuration of a pleasing architectural nature and which occupies perhaps but one square inch. The molding, after undergoing various preliminary shaping and surface finishing treatments, perhaps including painting, is preferably packed for subsequent handling and, usually, for sale in a box or carton. As shown in FIGS. 1 and 3 particularly, a typical packing carton 5 includes a relatively flat, narrow bottom 6 bounded by a pair of upstanding parallel side panels 7 and 8, shown open, but which eventually can be folded to protect the moldings deposited therein.

Pursuant to the invention and for easy handling, I customarily provide a cart 9 including a flat platform 10 supported on casters 11 and readily maneuverable into any position. Disposed on the cart between end walls 12 and 13 thereof is a plurality of the cartons or boxes 5 disposed side by side with their relatively extended lengths parallel to each other and to the end walls of the platform 10.

It is desired that each one of the individual boxes be provided with a predetermined or selected number or group of moldings for future handling and for sale.

In order to cooperate with the available boxes, I conveiently provide a main frame 21 comprised of the customary shapes, such as angles and channels, and designed to sit on the floor so that the cart 9 can readily be brought alongside and taken away. The frame 21 includes a pair of side panels 22 and 23 carrying a number of rollers 24 arranged to run within and guide and support a pair of parallel channels 25 and 26 of substantial length so that the channels can be translated to and fro. The channels in fact are part of a rectangular, flat carriage 27 including a number of cross members 28 and suitable connectors so that the carriage acts as a unit in sliding to and fro on the frame.

Means are provided for propelling the carriage including an electric motor 31 mounted on the frame 21 and connected by a short chain 32 to a jack shaft 33, the chain running over appropriate sprockets. From the jack shaft 33 the power is transmitted by a chain 34 to a cross shaft 36 journalled in the frame 21 and at its opposite extremities carrying a pair of sprockets 37 and 38. As the motor 31 rotates, the cross shaft 36 likewise rotates. Meshing with the sprockets 37 and 38 are chain lengths 39 disposed beneath and fixed to each of the channels 25 and 26. Thus, as the motor 31 is operated in either of two opposite directions, the carriage is correspondingly propelled or retracted.

The carriage 27 is particularly designed to receive and advance moldings. For that reason, at the leading end the carriage carries a cross shaft 41 and at its trailing end carries a similar cross shaft 42. These shafts are journalled in the carriage and intermediate their ends and centrally carry a plurality of belt pulleys 43. Engaging the pulleys 43 are belts 44 disposed correspondingly adjacent the sides of the carriage and adjacent its central portion.

In order that the belts may be appropriately driven, there is mounted on the carriage an electric motor 46 connected through a speed reducer 47 to a drive element 48 around the shaft 42. The effect of this mechanism is that when the motor 46 is energized the belts 44 are driven in a direction with the upper or top run of the belts advancing from left to right in FIG. 2 or from the rear end of the carriage toward the forward end thereof.

Mounted on and spanning the frame 21 above the belts 44 is a molding receiving and guiding trough 51. This trough is carried by a pair of downwardly depending plates, such as 52 at one end and 53 at the other, each of the plates carrying fasteners 58 passing through slotted ways 56 in the sides of the framework 21 so that the trough 51 can be advanced or retracted into any selected location over the carriage and can then be clamped in its proper position.

The guide trough 51 is in general alignment with a source of strips or moldings (not shown) effective to supply the molding or strips ready for packaging in a path which extends transversely of the main machine and along the guide trough 51. A molding strip is received endwise or athwart the carriage and is deposited upon the inclined surfaces of the guide 51. The received strip cannot extend or project excessively because of an upstanding stop plate 57 fastened to the plate 53. This arrests the strip advance when the molding overhangs the carriage equally on both sides. By gravity the received molding slides down and forwardly across the inclined surfaces of the guide trough 51 and ultimately deposits itself on and approximately normal to the various belts 44 of the carriage. Since those belts are traveling in a forward direction, the molding resting thereon likewise is carried forward to traverse the carriage.

As the molding advances in the indicated direction and as it approaches the forward margin or edge of the carriage adjacent the shaft 41 and around which the belts 44 curve, the extended end of each molding or strip passes through an extension frame 61 having an upper arm 62 and a lower arm 63, the latter of which is secured to the upper part of the carriage 27. The extension frame 61 is designed to support a source of illumination 64 in vertical alignment with an electric detector 66, the pair being referred to as an electric eye. The eye is included in a standard pulse counting circuit. Thus, as each molding advances along the carriage and as it is about to round the discharge edge of the carriage, the molding interrupts the light beam between the source 64 and the detector 66 and thus affords a single counting impulse. The molding continues around the ends of the belts 44 and over depending guides 67 and 68 fastened on the ends of the carriage frame. The molding is belt impelled and falls by gravity into the subjacent one of the series of boxes 5.

As shown in FIG. 1 the carriage is in an intermediate position, but it initially starts with the guides 67 and 68 substantially above the left-most one of the boxes; i.e., the box closest to the frame 21. The elongated strips or moldings then fall int the first box and lodge therein after having actuated the counter.

Since it is desired to have only a predetermined number of strips or moldings in each of the boxes, it is arranged that after a predetermined number, say 20 moldings, have actuated the electric eye 66, the carriage motor 31 is then energized to advance the carriage. That is, at the end of, say, 20 pulses from the electric eye, a relay is actuated to energize the motor 31 in a direction to advance the carriage toward the right in FIGS. 1 and 2.

Likewise in accordance with the invention, the advancing carriage is arrested as soon as it has advanced sufficiently to overlie the next adjacent one of the boxes 5. To accomplish this, I preferably provide on the frame 21, as particularly shown in FIGS. 7 and 8, a longitudinally extending bar 71 which has projecting therefrom a number of stops or buttons or cams 72 spaced apart a distance equal to the distance between the edges of the adjacent boxes 5. To cooperate with the cams 72 I provide a switch 73 including a rotary actuator 74 mounted on a bracket 76 secured to the framework of the carriage. The switch 73 is included in the circuitry to the carriage motor 31.

After the electric eye has generated sufficient impulses to energize the motor 31 and after the carriage has correspondingly started to advance on the frame 21, the cam wheel 74 encounters a cam 72 when the carriage has advanced the distance of one box. The cam 72 displaces the roller 74 to operate the switch 73 and so to de-energize the carriage drive motor 31. The carriage, after a short, predetermined advance, then stops with the guides 67 and 68 spanning the first box 5 and in line to guide the discharged moldings or strips into the next adjacent or second box 5.

During this time the belt motor 46 can continue to advance the belts since but a short time is taken to advance the carriage. Alternatively, if the carriage advance is relatively slow then it is preferred automatically to interrupt the operation of the belt motor 46 while and only while the carriage advance motor 31 is energized. In either event the moldings advancing on the carriage belts are, as before, carried around the leading end of the carriage to be impelled and to fall by gravity over the guides 67 and 68 and into the second box.

Each of the moldings in passing over the electric eye 66 interrupts the light beam and generates a pulse. After a predetermined number, say 19, the 20th pulse is effective again to energize the carriage motor 31 to advance the carriage until such time as the switch roller 74 encounters the next adjacent cam 72. Thereupon the carriage advance motor is stopped with the carriage in the next successive position over the next box. This cycle repeats itself until each one of the boxes 5 has received its charge of moldings or strips and is in effect filled.

In order that the carriage may be appropriately returned after its discharge in the final or last position over the last box, there is preferably provided on the frame 21 a return cam switch 78 (FIG. 4). This is connected by a chain 79 to the cross shaft 36 which is ultimately connected to and rotates with the carriage advance. When the carriage advances to its ultimate position, the cam switch 78 is also advanced to a position effective to place the motor 31 in reverse condition. Then, when the final count has been effectuated by the electric eye 66, instead of the carriage motor 31 being energized in a forward direction, it is correspondingly energized in the reverse direction. Simultaneously, it is preferred to stop the motor 46 so that the belts 44 no longer advance the moldings. During this portion of the cycle when the motor 31 is energized in reverse, the one-way roller actuator 74 does not affect the switch 73 and the carriage is restored to its initial position with the guides 67 and 68 overlying the space just adjacent the frame 21. A new carriage and supported boxes are there disposed.

While the structure can be automatically switched to repeat the previous cycle, it is preferred to have the start manually controlled just to make certain that the cart 9 with filled boxes has been removed and that a new cart with empty, properly aligned boxes is placed and is ready for loading. As soon as all is in readiness, the operator can press a push button to energize the motor 31. This motor is again in a forward driving condition since the cam switch 78 is resored to its forward position as soon as the carriage has attained its rearmost or home location. Upon restarting the mechanism manually, the motor 46 is started to drive the belts in a forward direction so that moldings thereon can be advanced, the carriage motor 31 having been started and the cycle, as previously described, is repeated.

What is claimed is:

1. A machine for loading strips into adjacent parallel boxes extending in one direction comprising a frame adjacent said boxes, a carriage, means for mounting said carriage on said frame for translation in a path normal to said direction and through a number of stations in each of which one end of said carriage substantially overlies a respective one of said boxes, a strip-conveyor belt, means for mounting said belt on said carriage to extend around said end thereof and for movement thereon parallel to said path, means on said frame for discharging onto said belt a plurality of strips disposed parallel to said direction, means for advancing said belt with said strips thereon toward said boxes, means on said frame for counting said strips advancing on said belt, means for translating said carriage through said number of stations in succession, means responsive to said counting means for controlling said translating means to advance said carriage from one of said stations toward the next one of said stations, and means responsive to the presence of said carriage in said next one of said stations for controlling said translating means to stop said carriage in said next one of said stations.

2. A machine as in claim 1 in which said means responsive to said counting means controls said translating means only to advance said carriage toward said boxes and said means responsive to the presence of said carriage in each of said stations controls said translating means only to stop said carriage.

3. A machine as in claim 1 in which said translating means is also effective to move said carriage away from said boxes, and including means at the end one of said stations for controlling said translating means to move said carriage away from the end one of said boxes through all of said stations.

4. A machine as in claim 1 including means having depending guides mounted on and at said one end of said carriage for guiding said strips from said belt toward a nether one of said boxes.

5. A machine as in claim 1 in which said counting means includes an electric eye, and means for mounting said electric eye on said carriage near the discharge end of said strip conveyor belt.

6. A machine as in claim 1 in which said means responsive to the presence of said carriage includes a stop cam for each of said stations.

7. A machine as in claim 1 including a guide trough mounted on said frame and spanning said strip-conveyor belt on said carriage parallel to said one direction and open on one side to said belt, and a stop plate on said frame at one end of said trough.

8. A machine as in claim 7 including means for moving said guide trough on said frame toward and away from said one end of said carriage.

* * * * *